United States Patent
Banaszak

[11] Patent Number: 5,804,697
[45] Date of Patent: Sep. 8, 1998

[54] REMOTE CONTROL STRUCTURAL EXCITER

[75] Inventor: David L. Banaszak, New Carlisle, Ohio

[73] Assignee: The United States of America as represented by the Secretary of the Air Force, Washington, D.C.

[21] Appl. No.: 805,942

[22] Filed: Feb. 24, 1997

[51] Int. Cl.$^6$ ...................................... G01P 21/00
[52] U.S. Cl. .............................................. 73/1.82
[58] Field of Search ....................... 73/1.01, 1.08, 73/1.15, 1.37, 1.38, 1.82, 1.83, 1.85, 1.86; 367/13

[56] References Cited

U.S. PATENT DOCUMENTS

| | | | |
|---|---|---|---|
| 3,830,091 | 8/1974 | Sinsky | 73/1 D |
| 3,850,028 | 11/1974 | Thompson et al. | 73/643 |
| 4,248,092 | 2/1981 | Vasile et al. | 73/643 |
| 4,869,092 | 9/1989 | Bernard et al. | 73/1.38 |
| 5,033,285 | 7/1991 | Bouche | 73/1 DV |
| 5,251,469 | 10/1993 | Chan | 73/1.86 |
| 5,455,006 | 10/1995 | Allen et al. | 73/1 D |
| 5,457,982 | 10/1995 | Spies et al. | 73/1.38 |

*Primary Examiner*—Robert Raevis
*Attorney, Agent, or Firm*—Gina S. Tollefson; Gerald B. Hollins; Thomas L. Kundert

[57] ABSTRACT

The present invention is a calibration system that allows one person to perform multiple end-to-end calibrations of a structural dynamic measurement system including mounted transducers, signal conditioning and recorder. Only one person is needed to operate the system at the recorder. The system stimulates structural measurement transducers contained inside of structures using remotely controlled exciters with a measurable acceleration level and the data measured by the transducers is communicated to a recorder.

12 Claims, 4 Drawing Sheets

REMOTE CONTROL STRUCTURAL EXCITER

RIGHTS OF THE GOVERNMENT

The invention described herein may be manufactured and used by or for the Government of the United States for all governmental purposes without the payment of any royalty.

BACKGROUND OF THE INVENTION

This invention relates to the field of calibration of transducers used for sensing dynamic structural motions.

The Air Force, as well as commercial industry, conducts numerous ground and flight test programs requiring vibration measurements on structures in laboratory and flight test environments. Programs requiring vibration measurements include flight tests, tests of wind tunnel models, tests of ground vehicles, tests of shipping containers, vibration surveys and modal analysis tests. Calibration of transducers contained on or within these dynamic structures for sensing the dynamic motions of the structure due to routine operational usage is essential to ensure that accurate and valid data is collected. Such data is used to predict operational life spans of such structures and to plan maintenance schedules for such structures.

FIG. 1 shows a typical measurement system for recording vibration data in an aircraft vibration test program. The transducers at 100 are installed at various locations throughout the aircraft. A recording system at 110 to record data from the transducers is usually hard-bolted somewhere in the cockpit area with wiring and signal conditioning at 120 connections to the transducers. Currently, transducers are calibrated in a laboratory environment before the transducer is mounted on a test structure. Once the transducer is mounted on a test structure, it is difficult to stimulate with a known physical input. A person must hold an exciter or attach a conventional vibration shaker to the structure. Shakers are of limited use because they are single channel and are designed for benchtop or table-top use. Holding an exciter onto the structure is labor intensive because it requires an individual dedicated to holding such exciter, and such individual cannot operate the recorder in the cockpit at the same time. Also, when an individual holds an exciter onto a structure, error due to extraneous vibration from the individual is introduced. For an end-to-end calibration that is starting at one end of the aircraft, and calibrating all transducers embedded at various locations throughout the aircraft, each transducer must be disconnected from the structure and connected directly to the calibrator. For example, if transducers such as accelerometers are permanently mounted on the end of each wing tip of an aircraft and also on the tip of the rudder, one operator must temporarily hold an exciter, in turn, on each of the structures near the permanently mounted accelerometers and a second operator must start and stop the recorder. Accordingly, calibrating mounted accelerometers from one end of the aircraft to another is extremely time consuming and labor intensive.

Invalid calibrations adversely impact an expensive test program. The Air Force is increasingly looking for ways to save time and cost. For example, the Air Force is investigating embedding transducers within structures at the time of manufacture in an attempt to save the time and cost of invading a finished structure. Similarly, the Air Force is investigating including a recorder and the associated wiring within an aircraft at the time of manufacture to avoid retrofitting the aircraft at a later date. The present invention significantly decreases calibration time, required manpower, and increases data validity.

SUMMARY OF THE INVENTION

The present invention is a calibration system that allows one person to perform multiple end-to-end calibrations of a structural dynamic measurement system including mounted transducers, signal conditioning and recorder. Only one person is needed to operate the system at the recorder. The system stimulates structural measurement transducers contained inside of structures using remotely controlled exciters with a measurable acceleration level and the data measured by the transducers is communicated to a recorder.

It is therefore an object of the present invention to provide a vibration calibration system that can be performed by a single operator.

It is another object of the present invention to provide a vibration calibration system useable in harsh environments while the operator is in a benign environment.

It is another object of the present invention to provide a vibration calibration system that stimulates transducers inside of structures in a non-invasive manner.

It is another object of the present invention to provide a vibration calibration system with increased accuracy and reduced extraneous vibration.

It is another object of the present invention to provide a vibration calibration system that may be performed on a structure while said structure is moving or operating.

Additional objects and features of the invention will be understood from the following description and claims, and the accompanying drawings.

These and other objects of the invention are achieved by a calibration device operable by a single individual for non-invasively calibrating a transducer attached to a dynamic structure under test to measure vibrations thereof comprising:

an exciter attachable to said dynamic structure in close proximity to said transducer;

means for selectively sending an exciter activating radio frequency signal to said exciter, said exciter activating radio frequency signal being of a preselected magnitude and enabling dynamic structure vibrating energy flow from said exciter; and means for recording vibration frequency of said dynamic structure under test measured by said transducer.

DETAILED DESCRIPTION

Figure 6:
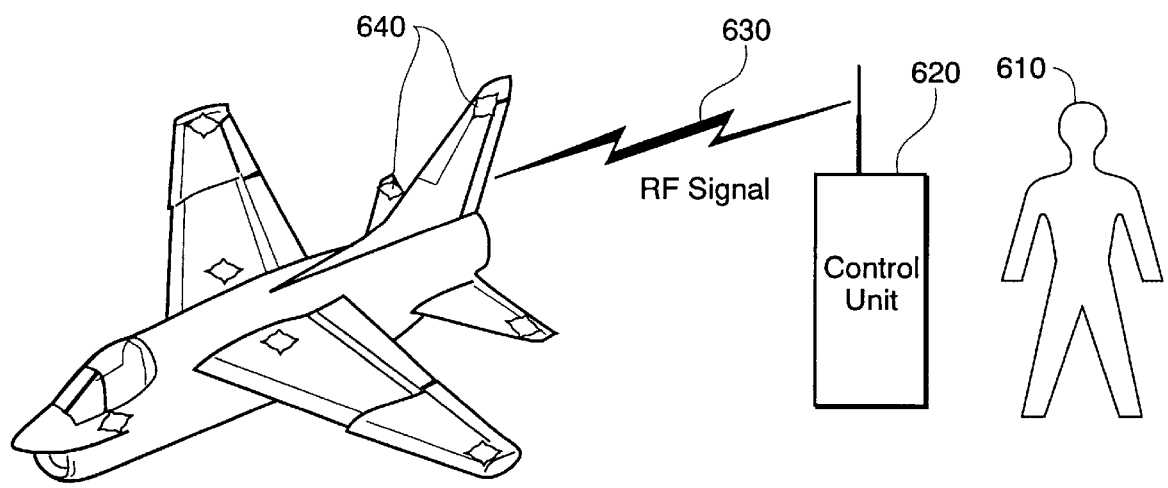
FIG. 6 shows typical use of an unattached structural exciter system for aircraft vibration tests in accordance with the present invention.

The remote control structural exciter system is a calibration system that allows one person to perform multiple calibrations of a structural dynamics measurement system including mounted transducers, signal conditioning and recorder. One person is needed to operate the recorder, as opposed to at least two operators which are required for all other known systems. The system stimulates structural measurement transducers located inside of structures using remotely controlled exciters with a measurable acceleration level and the measured data is communicated to a recorder. If possible, transducers are permanently mounted inside the structures to avoid disrupting the structure at a later time. In the present invention, the exciter can easily and quickly be mounted temporarily on the structure using double-sided tape to avoid damaging the structure and as a time savings. The present invention in use to calibrate transducers mounted at many different locations is seen in FIG. 6. The remotely controlled exciters, two of which are indicated at 640, are activated remotely by one individual 610 using the master control unit 620, and such individual can also operate the recorder.

Figure 1:
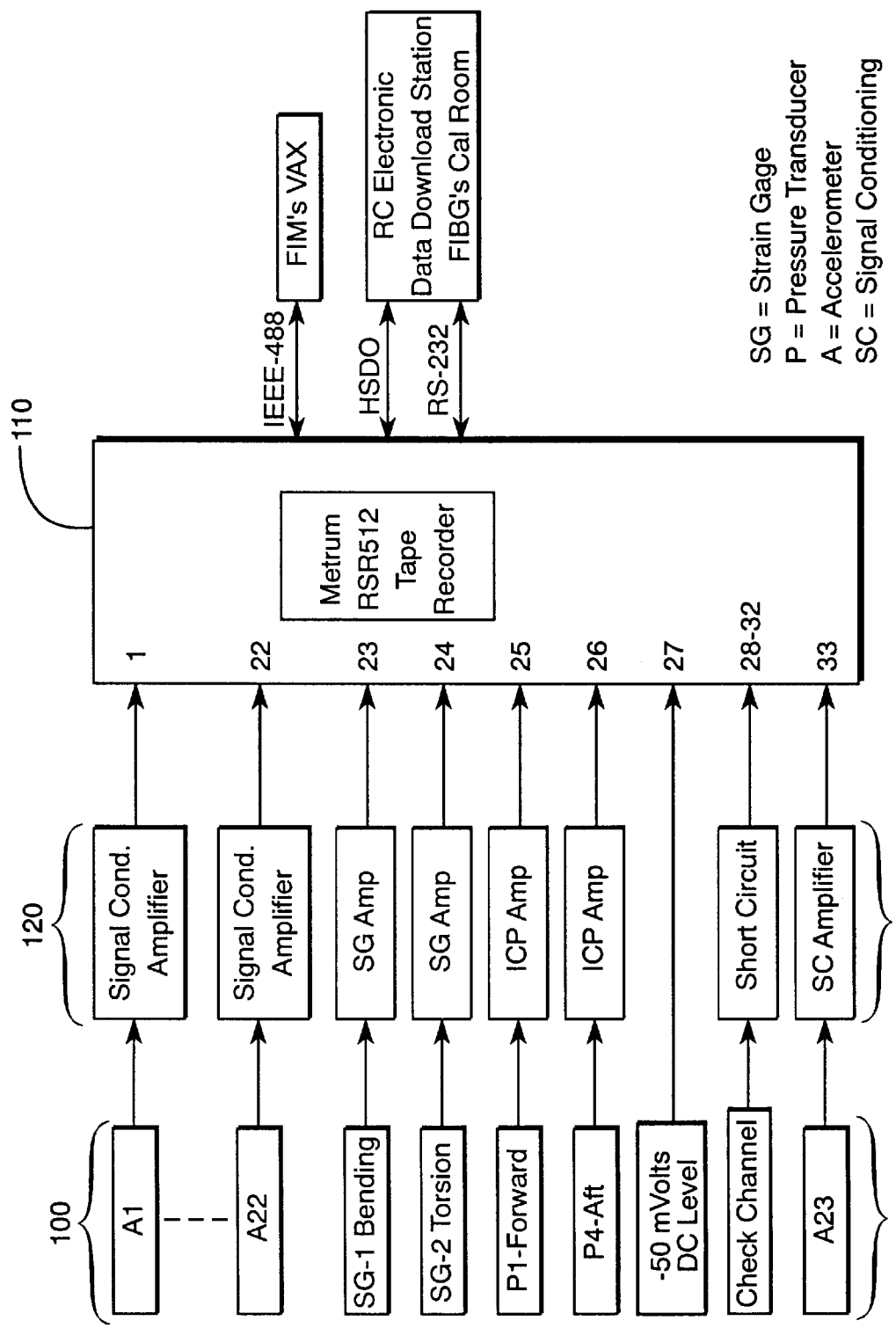
FIG. 1 shows a block diagram of a typical configuration of an aircraft vibration test program.
Figure 2:
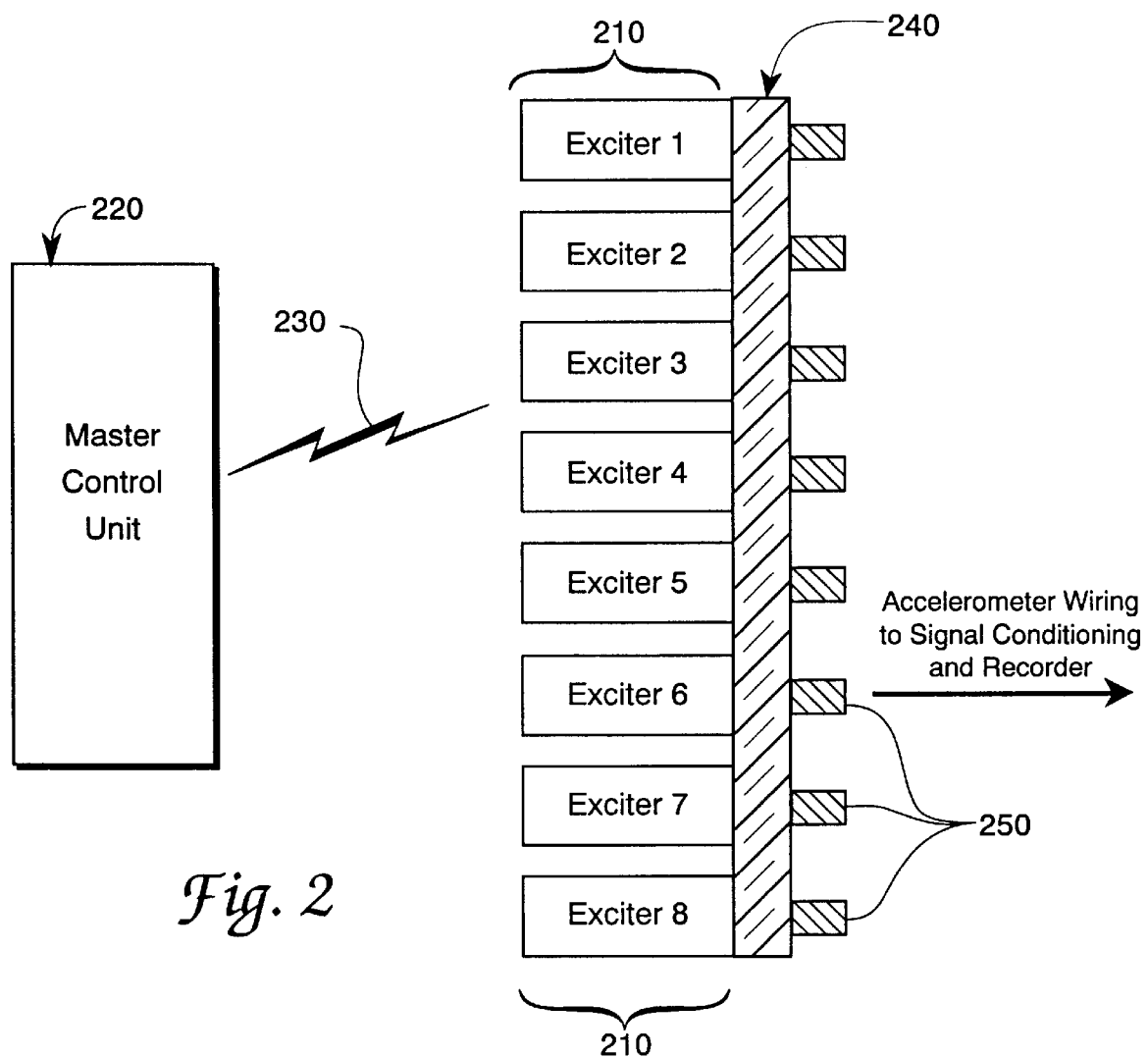
FIG. 2 shows a block diagram of a remote control exciter system in accordance with the present invention.

FIG. 2 shows an eight-channel remote control unattached structural exciter arrangement of the present invention. The figure shows an eight-channel system, however, the unattached structural exciter can be limited or expanded to stimulate as many transducers as required for a test. The structure under test is shown at 240 and three of the eight transducers, or accelerometers, being calibrated are shown at 250. Eight exciters 210 are temporarily attached to the structure under test 240. A master control unit 220 sends a short range radio frequency signal 230, a sinusoidal waveform of approximately 1.5 sec duration, to enable energy flow from the exciters 210. The exciters, having an independent energy supply, vibrate, which in turn vibrates the dynamic structure at a preselected frequency and the accelerometers in turn measure the resulting vibration of the structure. The short range radio frequency signal at 230 preferably has a transmit range of approximately one mile. This is generally adequate for calibration purposes. However, in the event greater transmit range is desired, a signal relay arrangement may be employed. The relay apparatus is situated close to the dead zone, that is, near the location where the master control unit's radio frequency signal does not reach. The relay apparatus receives the radio frequency signal from the master control unit and in turn retransmits the signal to the exciters, thereby increasing the range of the master control unit. Another option for extending range, especially when the master control unit will be situated near metal or structural walls is to mount the radio frequency signal transmitting antenna remotely from the master control unit clear of any metal, regardless of where the master control unit is located. The higher the antenna, the better the range. This will allow the antenna to transmit the exciter activating radio frequency signal without interference.

The accelerometers measure the acceleration of the dynamic structure under test resulting from the exciter vibration. The acceleration signal is then displayed on an oscilloscope and recorded on a tape recorder. A deviation between the preselected frequency signal of the exciter and that of the accelerometer indicates that the accelerometer is not operating correctly and should not be used to conduct vibration tests. Further analysis of the accelerometer, beyond the scope of the present invention, is required.

Figure 3:
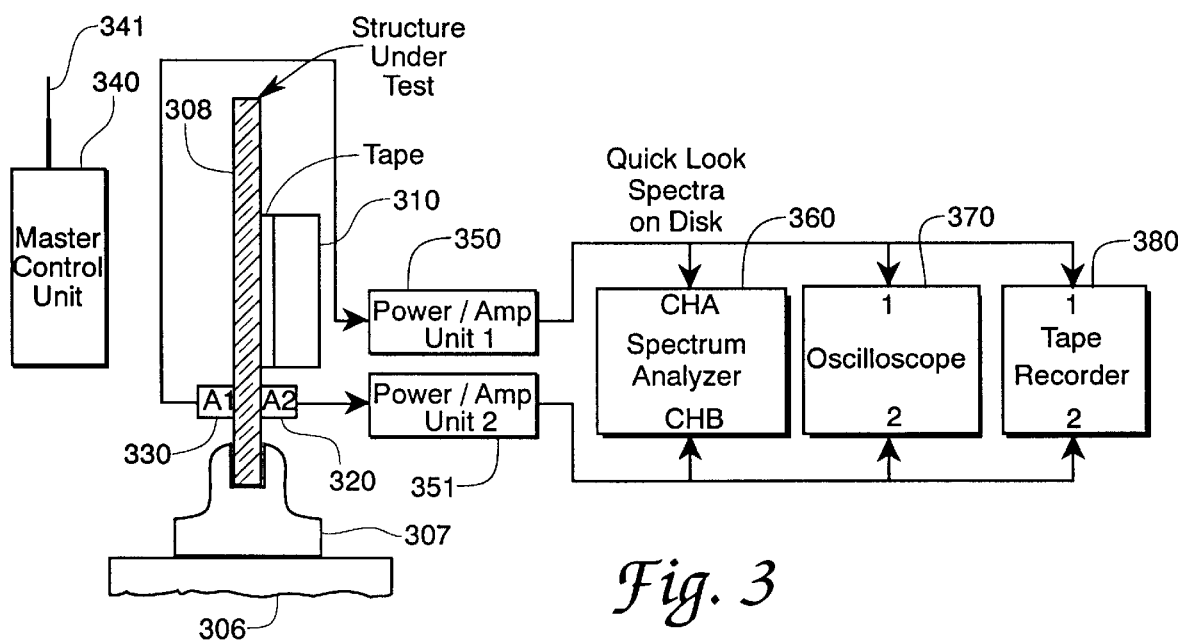
FIG. 3 shows a block diagram configuration in accordance with the present invention including data recording.

An experiment evaluating a commercial off-the-shelf vibration paging call system (consisting of a master control unit and eight individual exciters, or pagers) to implement the present invention is described. Use of commercial off-the-shelf paging systems will greatly reduce cost of performing a system calibration. The unit used in the present experiment was a J-Tech, Inc. model XT pager system. The objective of the experiment is to determine if a remotely controlled exciter can enable vibration levels that are useable for calibration. FIG. 3 shows a block diagram of a test set up for the present invention using the commercial off-the-shelf system. The structure under test 308, representing an aircraft wing tip or some other dynamic structure, is secured by a vice 307 on top of a foam pad 306. The foam pad is used to isolate the structure from table vibrations. The master control unit 340 transmits radio frequency signals which activate or enable the exciters. The master control unit requires a 110 V energy supply outlet and has an eight foot long cord. A battery operated master control unit may also be used. The antenna at 341 on the master control unit should be located as far from any surrounding metal or structural walls as possible for maximum range of the radio frequency signal. The master control unit also contains a transmit indicator light which illuminates when a short range radio frequency signal is sent via the master control unit. The radio frequency signal activates or enables the exciter 310 in a periodic cycle of energizations disposed at approximately a 1.5 second interval.

The exciter, or pager 310, is taped onto the front of the structure under test 308. In this test set up, two transducers or accelerometers are used. A first accelerometer 330 mounted on the back of the structure simulates an accelerometer mounted inside an aircraft structure under test which will be used after calibration during an actual flight to sense the vibration of the particular structure under test. A second accelerometer 320 mounted on the front of the structure, calibrated prior to the experiment, also measures the vibration of the structure and is used as a reference or control to compare to the accelerometer being calibrated. Two accelerometers are used in the experiment to provide additional accuracy. The second accelerometer 320, already calibrated, is used as a reference or standard to compare to the first accelerometer, the accelerometer under calibration. A properly functioning and accurate first accelerometer would have the exact or nearly the same value recorded as that of the second accelerometer. A large deviation between the values recorded from the first and second accelerometers would indicate an improperly functioning first accelerometer. Outputs from the first accelerometer 330 and the second accelerometer 320 are sent to signal conditioning units 350 and 351, respectively. The signal is then sent to the recording system where the oscilloscope 370 displays the signal and the tape recorder 380 records the signal.

The objective of the experiment is to determine if there are significant differences in the amount of vibration excitation levels induced into different combinations of exciters, structural materials and widths and exciter excitation modes. More specifically, the experiment was designed to measure the amplitude, frequency and transfer function for two structural materials, two structure widths, eight exciters and two control modes to determine the feasibility of using the unattached structural exciter as an accelerometer calibrator. The transfer function was measured because it compares the ratio of the output of the first accelerometer to the output of the second accelerometer. A ratio of one indicates that both accelerometers have the same vibration level.

For the experiment, the factors and levels (codes provided in parenthesis) were Material: aluminum(1) or wood(2); width(or thickness): thin(1) or thick(2); controller excitation mode: 1 sine burst(1) or 16 sine burst(16); and exciter ID: (1–8). The codes are used in Table 1. The experiment helped determine whether this new calibration concept gives repeatable or predictable vibration levels for different structure types. The thin aluminum simulated an aircraft wing and weighed 31.8 grams and had dimensions of 14.00×7.54× 0.11 cm. The thin wood weighed 21.4 grams and had dimensions of 35.03×2.78×0.30 cm. The thick wood weighed 364.9 grams and had dimensions of 49.86×5.54× 1.92 cm. Lastly, the thick Aluminum weighed 481.2 grams and had dimensions of 17.50×8.02×1.32 cm. Each accelerometer weighed less than 5 grams and an exciter had a mass of between 53 and 54 grams. The measurement order of the 64 total combinations of these four factors were completely randomized in accordance with good statistical practice. For each of the 64 combinations, a spectrum analyzer was used to record and compute the output amplitude, fundamental frequency and transfer function between the two accelerometers. Simultaneously, the two accelerometer outputs were recorded on tape for future detailed data analysis.

Other sources of variation in the experiment include the structure dimensions, mass, the exciter support, attachment material of the exciter to the structure, the person doing the calibration, environmental factors such as temperature and humidity, transducer voltage excitation, the measuring equipment (voltmeters, oscilloscopes and spectrum analyzers), signal conditioners between the transducer and measuring equipment, calculators and computers required to perform necessary computations. All tests were at room temperatures. For this experiment, the above variations are considered to be minor nuisance factors.

Figure 5:
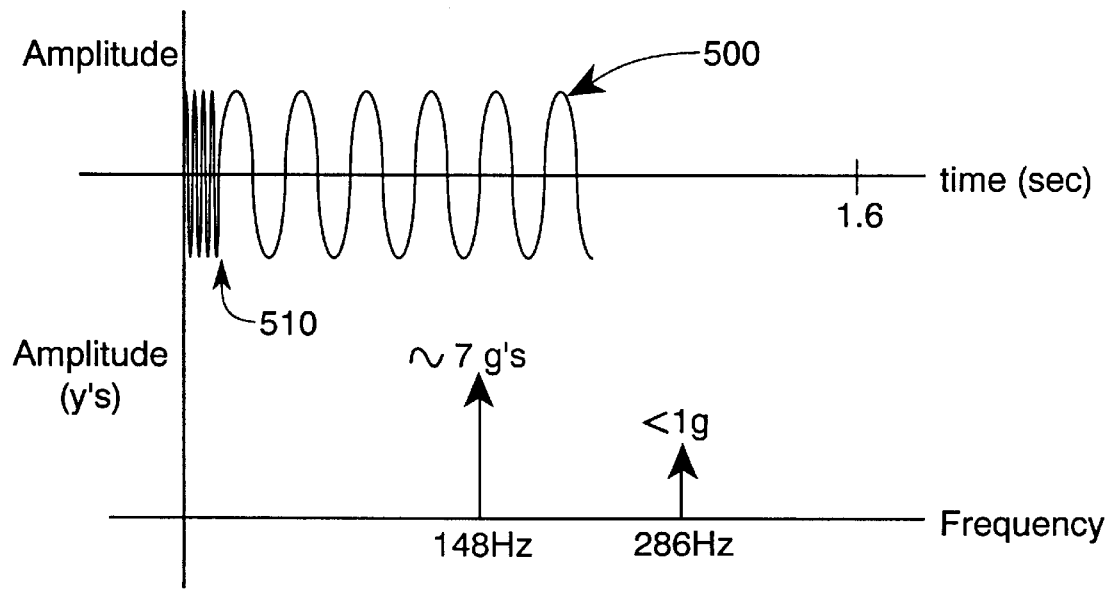
FIG. 5 represents an induced vibration signal from a remotely controlled structural exciter.

The accelerometer signals were displayed on a Tektronix oscilloscope and an Oni-Soki Model CF-6400 spectrum analyzer as shown in the upper and lower graphs of FIG. 5. Also, as shown in FIG. 5, the selected exciter provides a pulse of sinusoidal waveform energy 500 of a duration of about 0.8 second. The buildup of the sinusoidal waveform at 510 indicates that there is some error in the exciter. After it is remotely activated it produces a less than perfect sinusoidal waveform. The frequency content shows a fundamental frequency at 148 hertz and a harmonic at a lower level. Again, the signal has some error and is not exactly sinusoidal. The vibration measuring equipment (tape recorder and spectra analyzer) did not respond to this high frequency.

Figure 4:
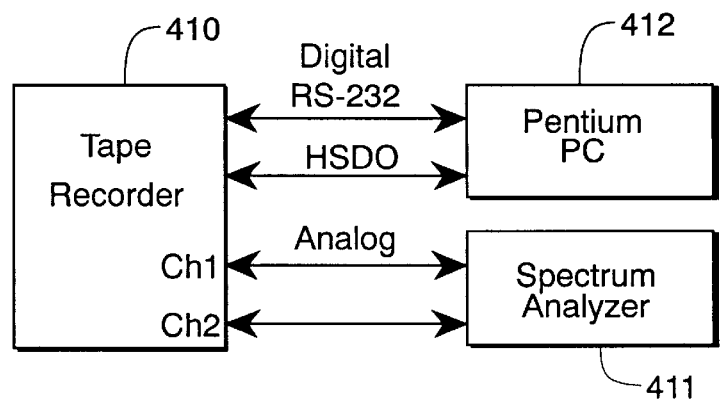
FIG. 4 shows a block diagram of data playback in accordance with the present invention.

A block diagram of data playback instrumentation is shown in FIG. 4. The time history signal recorded on the Metrum tape recorder 410 can be played back in analog format back into the spectrum analyzer 411. The signal can also be transferred in digital format to a personal computer 412. The tape recorder simulates a field test where we have transducers connect to a recorder secured in an aircraft cockpit.

The unattached structural exciter was configured for each combination of the four factor levels shown in Table I. For example, for the first test listed, exciter ID 6 was mounted on structure 308 in FIG. 3; the structural material used was thick wood and the excitation mode was one sinusoidal waveform initiated by the master controller. The spectrum analyzer and recorder were turned on to record the data before initiation of the exciter vibration by turning on the master control unit. The output from the two accelerometers were recorded as frequency spectra on the spectrum analyzer and recorded as time histories on tape at frequencies up to 5000 hertz. The dual channel analyzer was set up to measure vibration amplitude (a1, f0) in gs rms where a1 is the first accelerometer and f0 is fundamental frequency. One g is 9.80 m/sec$^2$ of acceleration and rms is the root mean square value of the vibration signal. The fundamental frequency (f0) is in units of hertz and the transfer function at the fundamental frequency H(f0) between accelerometers A1 330 and A2 320 for each of the 64 possible test conditions is provided in Table 1. The spectrum analyzer uses A1 output signal as a trigger signal to capture spectra for each vibration signal. For excitation mode 1, only one spectra was averaged and for excitation mode 16, all spectra were averaged.

The unattached structural exciter is a feasible product for the calibration of accelerometers that are in inaccessible locations. Measured vibration frequency of structures under test is significantly different for exciters from different manufacturers (indicated by serial numbers in Table), and material widths. Vibration amplitudes varied significantly for different materials under test, material widths and exciter serial numbers. Excitation mode was not a significant factor. The transfer function did not significantly change for different exciter serial number, type of material, material width or excitation mode. Hence, it is reasonable to assume that a comparison calibration between an accelerometer near the exciter(A2) and an unknown accelerometer(A1) embedded in the structure will be reasonably accurate. Since there is no currently known way to accomplish calibration of embedded transducers, this is a significant accomplishment.

While the apparatus and method described herein constitutes a preferred embodiment of the invention, it is to be understood that the invention is not limited to this precise form of apparatus or method and that changes may be made therein without departing from the scope of the invention which is defined in the appended claims.

TABLE 1

| Order | Pattern | ID | Material | Width | Mode | 10(Hz) | A110(gs) | H(10) | 11(Hz) | A111(ugs) |
|---|---|---|---|---|---|---|---|---|---|---|
| 1 | 6221 | 6 | Wood | Thick | 1 | 170.00 | 1.228 | 1.0010 | 340.00 | 44537 |
| 2 | 8122 | 8 | Al | Thick | 16 | 135.00 | 0.078 | 1.0030 | 268.75 | 285 |
| 3 | 8112 | 8 | Al | Thin | 16 | 133.75 | 0.078 | 0.9553 | 267.50 | 3815 |
| 4 | 1111 | 1 | Al | Thin | 1 | 153.75 | 0.380 | 0.9553 | 307.50 | 4835 |
| 5 | 6121 | 6 | Al | Thick | 1 | 181.25 | 0.160 | 0.9934 | 362.50 | 4610 |
| 6 | 5222 | 5 | Wood | Thick | 16 | 172.50 | 1.092 | 1.0090 | 346.25 | 90917 |
| 7 | 3221 | 3 | Wood | Thick | 1 | 175.00 | 0.902 | 1.0110 | 348.75 | 62705 |
| 8 | 7111 | 7 | Al | Thin | 1 | 163.75 | 0.417 | 0.9288 | 327.50 | 24684 |
| 9 | 8111 | 8 | Al | Thin | 1 | 136.25 | 0.153 | 0.9231 | 273.75 | 3723 |
| 10 | 6222 | 6 | Wood | Thick | 16 | 180.00 | 1.733 | 1.0070 | 360.00 | 26280 |
| 11 | 4222 | 4 | Wood | Thick | 16 | 177.50 | 1.390 | 1.0100 | 356.25 | 69588 |
| 12 | 4122 | 4 | Al | Thick | 16 | 177.50 | 0.123 | 1.0050 | 356.25 | 745 |
| 13 | 5122 | 5 | Al | Thick | 16 | 175.00 | 0.133 | 1.0050 | 348.75 | 5437 |
| 14 | 7211 | 7 | Wood | Thin | 1 | 171.25 | 4.527 | 0.9920 | 343.75 | 26740 |
| 15 | 1221 | 1 | Wood | Thick | 1 | 156.25 | 0.285 | 1.0300 | 311.25 | 5430 |
| 16 | 2111 | 2 | Al | Thin | 1 | 153.75 | 0.129 | 0.9144 | 308.75 | 40906 |

TABLE 1-continued

| Order | Pattern | ID | Material | Width | Mode | 10(Hz) | A110(gs) | H(10) | 11(Hz) | A111(ugs) |
|---|---|---|---|---|---|---|---|---|---|---|
| 17 | 6112 | 6 | Al | Thin | 16 | 181.25 | 0.430 | 1.0140 | 362.50 | 14517 |
| 18 | 6212 | 6 | Wood | Thin | 16 | 171.25 | 5.381 | 0.9999 | 341.25 | 90482 |
| 19 | 8121 | 8 | Al | Thick | 1 | 131.25 | 0.072 | 1.0120 | 262.50 | 249 |
| 20 | 2222 | 2 | Wood | Thick | 16 | 148.75 | 0.233 | 0.9477 | 296.25 | 52476 |
| 21 | 5221 | 5 | Wood | Thick | 1 | 176.25 | 1.286 | 0.9882 | 352.50 | 54017 |
| 22 | 5211 | 5 | Wood | Thin | 1 | 173.75 | 4.363 | 1.0200 | 347.50 | 234052 |
| 23 | 7222 | 7 | Wood | Thick | 16 | 177.50 | 1.162 | 0.9945 | 355.00 | 54221 |
| 24 | 1121 | 1 | Al | Thick | 1 | 158.75 | 0.103 | 1.0050 | 317.50 | 421 |
| 25 | 2212 | 2 | Wood | Thin | 16 | 156.25 | 2.385 | 0.9747 | 311.25 | 16134 |
| 26 | 2122 | 2 | Al | Thick | 16 | 156.25 | 0.098 | 1.0040 | 313.75 | 1053 |
| 27 | 4211 | 4 | Wood | Thin | 1 | 175.00 | 4.671 | 0.9653 | 350.00 | 115617 |
| 28 | 1122 | 1 | Al | Thick | 16 | 158.75 | 0.104 | 1.0050 | 317.50 | 393 |
| 29 | 3211 | 3 | Wood | Thin | 1 | 168.75 | 3.451 | 1.0030 | 337.50 | 623 |
| 30 | 5112 | 5 | Al | Thin | 16 | 168.75 | 0.533 | 1.0670 | 338.75 | 103363 |
| 31 | 7212 | 7 | Wood | Thin | 16 | 171.25 | 6.930 | 1.0010 | 342.50 | 177390 |
| 32 | 3212 | 3 | Wood | Thin | 16 | 170.00 | 4.436 | 0.9849 | 338.75 | 334 |
| 33 | 4221 | 4 | Wood | Thick | 1 | 180.00 | 1.488 | 1.0030 | 360.00 | 58758 |
| 34 | 2221 | 2 | Wood | Thick | 1 | 156.25 | 0.289 | 1.0090 | 313.75 | 10950 |
| 35 | 1112 | 1 | Al | Thin | 16 | 148.75 | 0.161 | 1.0650 | 297.50 | 106472 |
| 36 | 2112 | 2 | Al | Thin | 16 | 136.25 | 0.250 | 1.0400 | 273.75 | 52523 |
| 37 | 7112 | 7 | Al | Thin | 16 | 176.25 | 0.408 | 1.0790 | 352.50 | 9058 |
| 38 | 3111 | 3 | Al | Thin | 1 | 176.25 | 0.531 | 0.9545 | 352.50 | 36341 |
| 39 | 7221 | 7 | Wood | Thick | 1 | 178.75 | 1.277 | 1.0090 | 356.25 | 59189 |
| 40 | 7121 | 7 | Al | Thick | 1 | 178.75 | 0.129 | 1.0060 | 357.50 | 8002 |
| 41 | 3222 | 3 | Wood | Thick | 16 | 177.50 | 1.045 | 0.9960 | 353.75 | 45266 |
| 42 | 8222 | 8 | Wood | Thick | 16 | 136.25 | 0.071 | 1.0270 | 271.25 | 1980 |
| 43 | 8221 | 8 | Wood | Thick | 1 | 132.50 | 0.064 | 1.0150 | 265.00 | 2964 |
| 44 | 2211 | 2 | Wood | Thin | 1 | 158.75 | 2.561 | 1.0090 | 317.50 | 11037 |
| 45 | 2121 | 2 | Al | Thick | 1 | 157.50 | 0.110 | 1.0060 | 315.00 | 1331 |
| 46 | 1211 | 1 | Wood | Thin | 1 | 157.50 | 2.288 | 1.0100 | 313.75 | 18998 |
| 47 | 6211 | 6 | Wood | Thin | 1 | 172.50 | 4.862 | 1.0030 | 345.00 | 305785 |
| 48 | 6122 | 6 | Al | Thick | 16 | 183.75 | 0.135 | 1.0010 | 367.50 | 5543 |
| 49 | 5111 | 5 | Al | Thin | 1 | 170.00 | 0.507 | 1.0730 | 338.75 | 448071 |
| 50 | 6111 | 6 | Al | Thin | 1 | 182.50 | 0.573 | 1.0480 | 366.25 | 17860 |
| 51 | 8212 | 8 | Wood | Thin | 16 | 136.25 | 1.319 | 0.9841 | 272.50 | 26571 |
| 52 | 7122 | 7 | Al | Thick | 16 | 178.75 | 0.129 | 0.9979 | 357.50 | 8288 |
| 53 | 4112 | 4 | Al | Thin | 16 | 171.25 | 0.246 | 1.0370 | 341.25 | 351752 |
| 54 | 8211 | 8 | Wood | Thin | 1 | 137.50 | 1.055 | 1.0350 | 275.00 | 23929 |
| 55 | 4121 | 4 | Al | Thick | 1 | 178.75 | 0.139 | 1.0000 | 357.50 | 7415 |
| 56 | 4212 | 4 | Wood | Thin | 16 | 167.50 | 7.547 | 1.0040 | 332.50 | 273908 |
| 57 | 3122 | 3 | Al | Thick | 16 | 176.25 | 0.122 | 0.9957 | 352.50 | 10269 |
| 58 | 1212 | 1 | Wood | Thin | 16 | 153.75 | 3.511 | 1.0050 | 307.50 | 53075 |
| 59 | 3121 | 3 | Al | Thick | 1 | 176.25 | 0.124 | 0.9988 | 352.50 | 6835 |
| 60 | 5212 | 5 | Wood | Thin | 16 | 168.75 | 5.974 | 0.9988 | 336.25 | 242680 |
| 61 | 5121 | 5 | Al | Thick | 1 | 176.25 | 0.131 | 1.0010 | 352.50 | 8046 |
| 62 | 3112 | 3 | Al | Thin | 16 | 171.25 | 0.580 | 1.0840 | 342.50 | 29496 |
| 63 | 1222 | 1 | Wood | Thick | 16 | 156.25 | 0.282 | 1.0100 | 312.50 | 3858 |
| 64 | 4111 | 4 | Al | Thin | 1 | 176.25 | 0.839 | 1.0350 | 352.50 | 26588 |

I claim:

1. A calibration device operable by a single individual for non-invasively calibrating a transducer attached to a dynamic structure under test to measure vibrations thereof comprising:

an exciter attachable to said dynamic structure in close proximity to said transducer;

means for selectively sending an exciter activating radio frequency signal to said exciter, said exciter activating radio frequency signal being of a preselected magnitude and enabling dynamic structure vibrating energy flow from said exciter;

said means for sending an exciter activating radio frequency signal comprises an antenna and exciter activating radio frequency signal circuitry; and means for recording vibration frequency of said dynamic structure under test measured by said transducer, said transducer being responsive to said vibration of said dynamic structure due to said exciter.

2. The calibration device as in claim 1, wherein said transducer comprises an accelerometer.

3. The calibration device as in claim 1, wherein said exciter activating radio frequency signal comprises a sinusoidal waveform of 1.5 sec duration.

4. The calibration device as in claim 1, further including a radio frequency signal relay apparatus for extending range of said exciter activating radio frequency signal, located between said means for sending an exciter activating radio frequency signal and said exciter, said radio frequency signal relay apparatus receiving said exciter activating radio frequency signal and retransmitting to said exciter.

5. The calibration device as in claim 1, wherein said exciter is attached to said dynamic structure under test using tesa® 4970 double-sided PVC tape.

6. The calibration device as in claim 1, said means for recording vibration data comprises a spectrum analyzer and digital tape recorder.

7. The calibration device as in claim 1, said exciter being a pager call system.

8. The calibration device as in claim 7, wherein said exciter and means for selectively sending an exciter activating radio frequency signal comprises a J-TECH, Inc. model 'XT' pager system.

9. The calibration device as in claim 1, said means for selectively sending an exciter activating radio frequency signal comprising a pager control unit.

10. A method performable by a single individual of non-invasively calibrating a first plurality of inaccessible transducers intermittently attached to a dynamic structure comprising the steps of:

exciting said dynamic structure at a plurality of locations, each location in close proximity to one said first plurality of inaccessible transducers and one of a second plurality of transducers, said transducers responsive to said vibration of said dynamic structure due to said exciter;

selectively sending exciter activating radio frequency signals to said enable said exciting step;

relaying said exciter activating radio frequency signal to extend the range of said exciter activating radio frequency signal; and recording vibration data from said first and second plurality of transducers wherein a deviation of vibration data from said first plurality of transducers from vibration data from said second plurality is proportional to the accuracy of the first plurality of transducers.

11. The method of claim 10 performable by a single individual of non-invasively calibrating, said transducers comprising accelerometers.

12. The method of claim 10 performable by a single individual of non-invasively calibrating, said exciter activating radio frequency signal comprising sinusoidal waveforms.

* * * * *

UNITED STATES PATENT AND TRADEMARK OFFICE
CERTIFICATE OF CORRECTION

PATENT NO. : 5,804,697
DATED : September 8, 1998
INVENTOR(S) : David L. Banaszak It is certified that error appears in the above-identified patent and that said Letters Patent is hereby corrected as shown below:

COLUMN 6:

*Table 1, heading 7, "10(Hz)" should read ---f0(Hz)---.*
*Table 1, heading 8, "A110(gs)" should read ---A1f0(gs)----.*
*Table 1, heading 9, "H(10)" should read ---H(f0)---.*
*Table 1, heading 10, "11(Hz)" should read ---f1(Hz)---.*
*Table 1, heading 11, "A111(ugs)" should read ---(A1f1(ugs)---.*

Signed and Sealed this

Sixteenth Day of February, 1999

Attest:

Attesting Officer

*Acting Commissioner of Patents and Trademarks*